March 21, 1961 G. V. BUTLER 2,975,676
MISSILE LAUNCHING SYSTEMS FOR AIRCRAFT
Filed Oct. 20, 1950 6 Sheets-Sheet 1

INVENTOR
GEORGE V. BUTLER
BY
ATTORNEYS

INVENTOR
GEORGE V. BUTLER

BY

ATTORNEYS

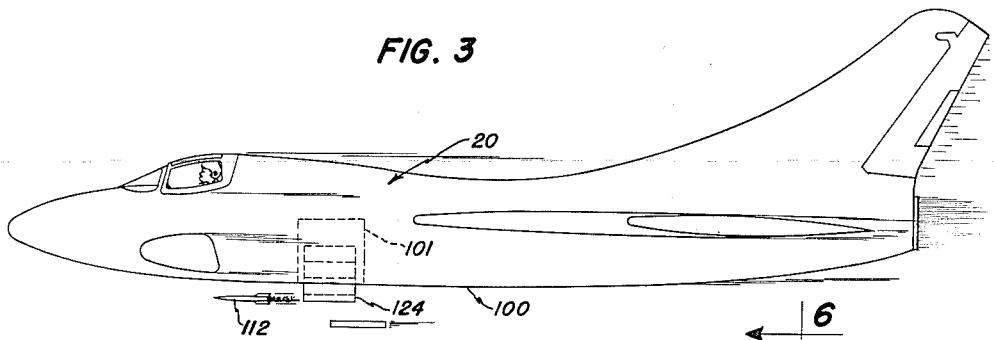
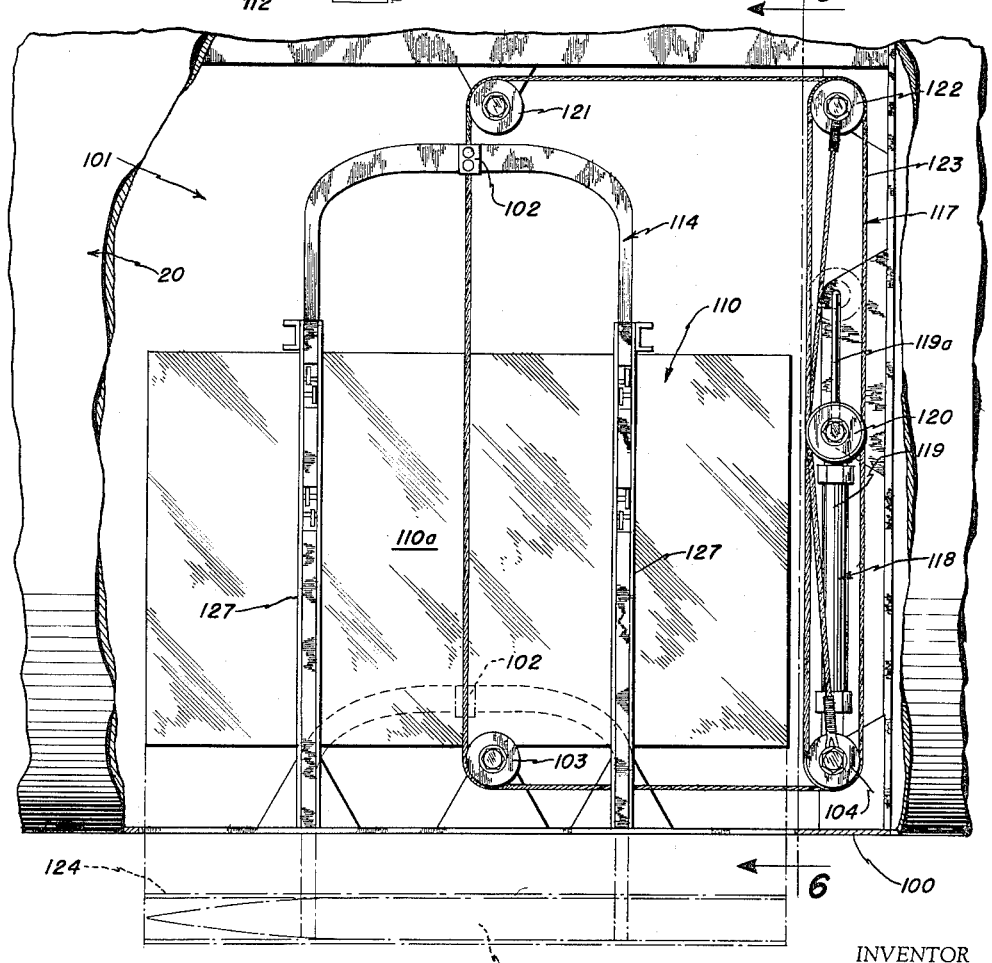

March 21, 1961 G. V. BUTLER 2,975,676
MISSILE LAUNCHING SYSTEMS FOR AIRCRAFT
Filed Oct. 20, 1950 6 Sheets-Sheet 4

INVENTOR
GEORGE V. BUTLER
BY
ATTORNEYS

March 21, 1961  G. V. BUTLER  2,975,676
MISSILE LAUNCHING SYSTEMS FOR AIRCRAFT
Filed Oct. 20, 1950 6 Sheets-Sheet 5

INVENTOR
GEORGE V. BUTLER
BY
ATTORNEYS

United States Patent Office 2,975,676
Patented Mar. 21, 1961

2,975,676

MISSILE LAUNCHING SYSTEMS FOR AIRCRAFT

George V. Butler, Dallas, Tex., assignor, by mesne assignments, to Chance Vought Corporation, a corporation of Delaware Filed Oct. 20, 1950, Ser. No. 191,115

3 Claims. (Cl. 89—1.7)

The present invention relates generally to missile launchers, and is principally concerned with rocket or similar type launching systems particularly adapted for mounting on aircraft although not limited thereto.

There are several inherent difficulties in arming an aircraft with rocket type launching systems capable of firing a substantial number of missiles in rapid succession. Among such difficulties is the provision of a launching guide, a missile storage magazine, and a missile feed connection between the magazine and the guide enabling the launching of rockets free and clear of the aircraft fuselage and appendages. Another such difficulty resides in providing such a rocket launching system without creating any undue deleterious effects upon the air flow characteristics of the craft. The present invention is directed toward overcoming such difficulties as those above-mentioned by providing an extendible and retractable launching system for rocket type missiles or the like, wherein the entire launching system may be housed within the fuselage or other suitable portion of the aircraft during that portion of the craft's flight when it is not desired to fire any missiles.

In general, the present invention contemplates the provision of an extendible and retractable missile launching system for airplanes, wherein the launcher may be extended at will from the body of the airplane to launch rocket type missiles or the like from a position which places their flight path free and clear of the airplane's fuselage and its appendages, and wherein the launching system may be retracted at will to come wholly or substantially within the body of the airplane, leaving the air flow unobstructed by any protrusions. In accordance with one exemplary embodiment of the present invention, a carriage or basket carrying a plurality of stacked missiles each individually housed within a suitable expendible launching tube, is mounted within the airplane to enable the ready extension thereof from or retraction thereof into the body of the airplane as desired. The basket is further provided with a ram or similar device for advancing the stacked missiles through the basket to place them successively in a firing position; and as each missile is fired from its individual launching tube, the ram advances the stack of missiles to place the next succeeding missile and associated launching tube in firing position as the empty launching tube of the previously fired missile is ejected by this advancement. In accordance with another exemplary embodiment of the present invention, a plurality of missiles all contained within individual launching tubes are housed within a missile carriage or basket extendible from or retractable into the fuselage or other desired portion of the airplane, and whose extended position at once places the flight path of all the missiles free and clear of the airplane's body and its appendages, ready for firing from their individual launching tubes either simultaneously to set up a missile barrage or individually, as desired and controlled by a suitable firing circuit.

It is therefore one object of the present invention to provide a missile launcher particularly adapted for mounting upon an aircraft, which may be readily extended from the body thereof to place the flight path of missiles launched therefrom clear of the body and appendages of the aircraft, and may be readily retracted into the body thereof so as not to interfere with its maneuvering or the air flow therealong.

Another object of the present invention is to provide a missile launching system particularly adapted to aircraft use, which may be readily extended from the body of the craft into missile launching condition and may be readily retracted into the body thereof into non-launching condition, wherein a plurality of missiles may be successively fed into a missile launching position and successively fired therefrom when the launching system is in extended condition.

Another object of the present invention is to provide a missile launching system particularly adapted for aircraft use, which may be readily extended from or retracted into the body of the craft and which houses a plurality of missiles, so that the missiles may be fired from the launcher as desired when in extended position.

Another object of the present invention is to provide a missile launching system particularly adapted for aircraft use, which may be extended from or retracted into the body of the craft, so that when in extended position a plurality of missiles may be fired therefrom as desired, and so that the launcher may be reloaded when in retracted position.

Other objects and advantages of the present invention will become apparent to those skilled in the art from a consideration of the following detailed description of several exemplary embodiments thereof made in conjunction with the accompanying drawings, in which like numerals refer to the same or corresponding parts and wherein:

Fig. 3 is an elevation view of an aircraft firing a rocket from a launching system comprising a second embodiment of the present invention;

Fig. 4 is an elevation view of the launching system indicated in Fig. 3;

Figure 1:
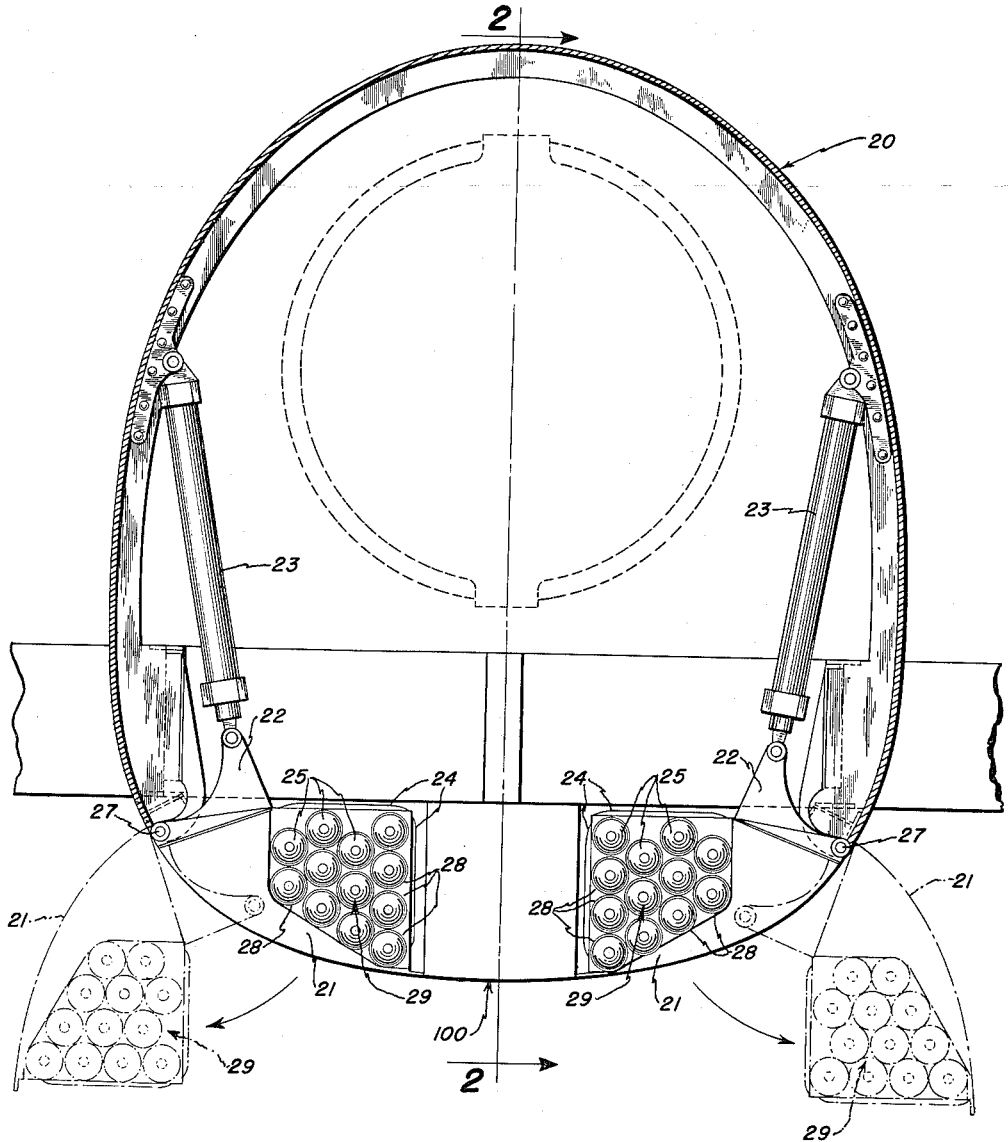
Fig. 1 is a cross-sectional view of an aircraft showing an end view of a missile launching system comprising one embodiment of the present invention.
Figure 2:
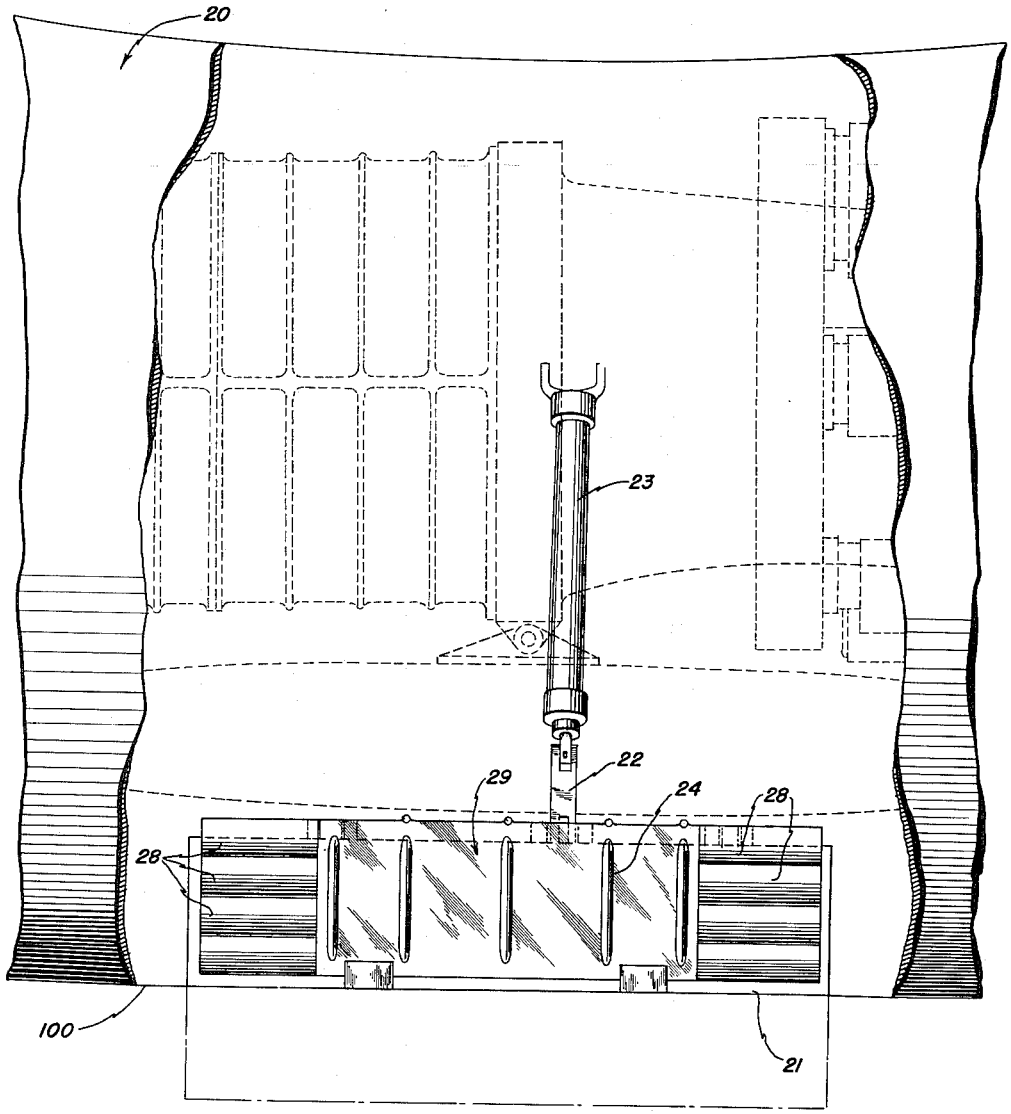
Fig. 2 is a side elevational view of one of the launchers shown in Fig. 1 taken substantially along the line 2—2 thereof.
Figure 8:
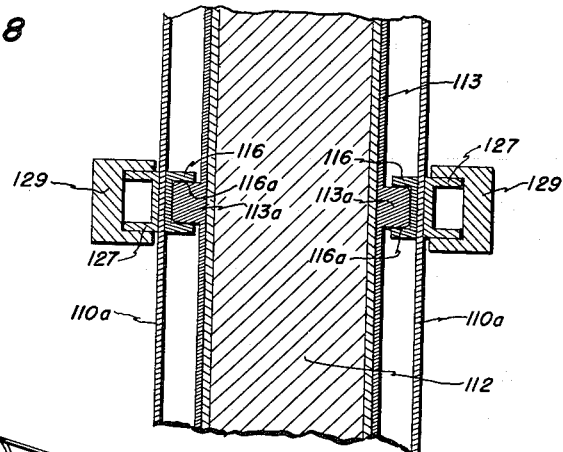
Fig. 8 is a cross-sectional view of the launcher taken substantially along the line 8—8 of Fig. 7.
Figure 5:
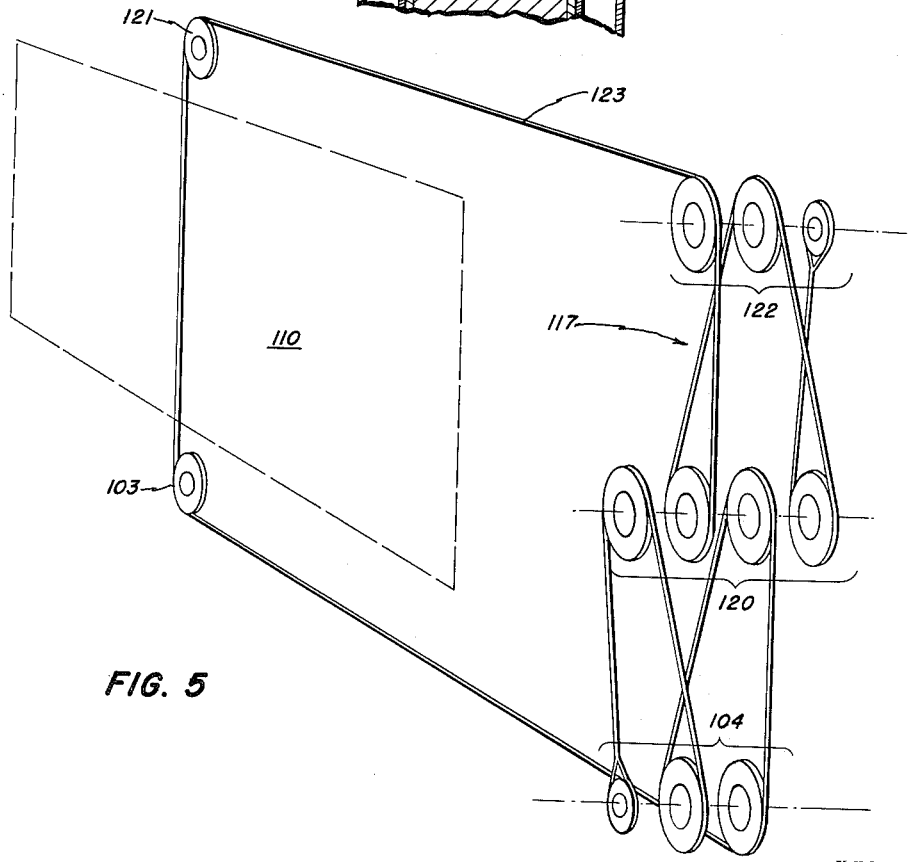
Fig. 5 is an exploded schematic illustration of a pulley system for operating the missile launcher illustrated in Figs. 3 and 4.

Considering first the embodiment shown in Figs. 1 and 2, as there shown the fuselage 20 of an airplane is provided with a pair of doors 21 pivotally hinged at 27 for swingable action between a retracted position as shown in solid lines and an extended position as shown in dot-dash lines. When in retracted position the doors 21 lie flush with and form a part of the fuselage 20, but when swung into extended position, like conventional bomb bay doors they extend below the bottom of the fuselage. The doors 21 are provided with an auxiliary structure 24 cooperating therewith to form a basket or carriage 29 closed around its sides but open at both its ends, wherein a plurality of rockets 25 may be positioned with their ends lying at or directed toward the open ends of the basket. The positioning of the missiles 25 within the chamber 29 is preferably accomplished in one of two ways: the rockets 25 may each be individually supplied with an encompassing launching tube 28, and the several missiles each with its launching tube may be appropriately positioned within the chamber or basket 29 to provide a tight fit between the several launching tubes and between the launching tubes and the sidewalls of said chamber or basket; or alternatively, the chamber 29 may be provided with a similar arrangement of permanent launching tubes 28 affixed to each other and to the sidewalls of the chamber as an integral part of the chamber, and missiles may be positioned within the launching tubes as desired. Each door 21 is further provided with an extending connecting plate or lever arm 22 affixed to one end of a hydraulic piston or hydraulic actuating strut 23, preferably self-locking in open and closed positions, as are well known in the art. Therefore, when the pistons 23 are extended, they act upon the connecting plates 22 to pivot the doors 21 about their hinges 27 into extended (dot-dash line) position, and upon being retracted, to similarly retract the doors 21 into retracted position and flush with the belly of the fuselage.

As is apparent to those skilled in the art, the missile clusters formed within the launching chambers 29 may be provided with a suitable electrical or other type firing circuit for firing missiles positioned within the launching tubes 28 either singly, sequentially, or simultaneously as desired. Furthermore, such a firing circuit may be provided with a safety switch actuated by the doors 21 or any part of their operating equipment, to place the firing circuit in fire condition only when the doors are fully extended, and to otherwise place the firing circuit in a safe or nonfiring condition.

In operation therefore, at all times during the aircraft's flight when it is not in a combat zone or otherwise when it is not desired to fire the rockets or other missiles housed within the launching chambers 29, the doors 21 may be held in retracted position, thereby providing no obstruction to maneuvers of the aircraft or to the air flow therealong. However, when it is desired to fire the missiles loaded in the launching chambers 29, the doors 21 are swung into their extended (dot-dash line) position, placing the firing circuit in operative condition and positioning the missiles 25 so as to provide a launching path free and clear of the aircraft body and appendages during the missile take-off. The missiles may then be launched from their launching tube either singly, sequentially, or simultaneously as desired. After all the missiles have been fired from the launching chambers 29, or at any other time when desired, the doors 21 may be swung into retracted position and the launching chambers may then be reloaded manually or by any suitable automatic means.

As would be apparent to those skilled in the art, although the present embodiment is here described as comprising two swingable doors mounted on the underside of the fuselage, any arrangement of doors may be employed and may be located at any suitable place on the craft. Furthermore, the launching chambers 29 may be designed in any suitable manner other than that specifically described, as for example by providing a single stack of missiles or missile launching tubes along the inner side of the doors, or a plurality of such stacks shielded and separated from each other by a plurality of partition shields lying in planes substantially parallel to the inner side of said doors.

A second embodiment of the present invention is illustrated in Figs. 3, 4, 5, 6, 7, and 8, and as there illustrated comprises a carriage 110 housed within a chamber 101 located substantially adjacent the bottom side 100 of the fuselage 20 of an aircraft. The carriage houses a plurality of rockets or other similar missiles and is movable along the chamber 101 between an extended missile launching position, shown in Fig. 3 and in the dot-dash line representations of Figs. 4 and 6, and a retracted non-launching position, shown in the solid line representations of Figs. 4 and 6. When the carriage 110 is in extended position, the missile launching portion 124 thereof depends a sufficient distance from the bottom 100 of the airplane fuselage to place that missile 112 which is in the launching position 124 sufficiently free and clear of the airplane body and its appendages to enable a firing and launching of the missiles therefrom without danger of collision with any part of the aircraft.

As shown in Fig. 4, the missile carriage 110 is provided with the carriage moving and missile advancing ram 114, which operates to lower the carriage 110 into extended (dot-dash line) position and into retracted (solid line) position, and to advance missiles carried by the carriage into the missile launching position 124 thereof when the carriage is in extended or missile launching position. For these purposes, the ram 114 is provided with a pulley arrangement generally indicated by the numeral 117 comprising the cable 123, the stationary pulley blocks 121, 122, 103, and 104 and the movable pulley block 120, the ram 114 being secured to the cable 123 for movement therewith by any suitable clamping means as indicated at 102. A hydraulic operating means for this pulley arrangement, generally indicated by the numeral 118, is provided with the piston 119 carrying the movable pulley block 120 for movement therewith along track 119a, to elevate or lower the ram 114 as will be apparent to those skilled in the art from a consideration of the pulley arrangement shown in the schematic exploded perspective view thereof had in Fig. 5.

Figure 6:
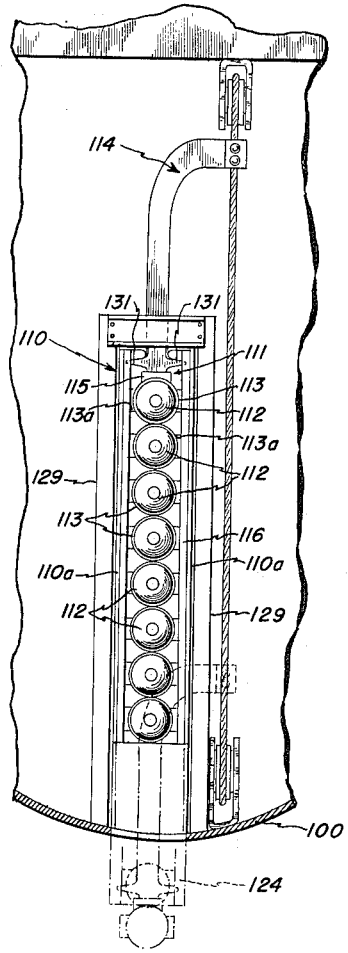
Fig. 6 is an end view of the launcher shown in Figs. 3 and 4 taken substantially along the line 6—6 of Fig. 4.
Figure 7:
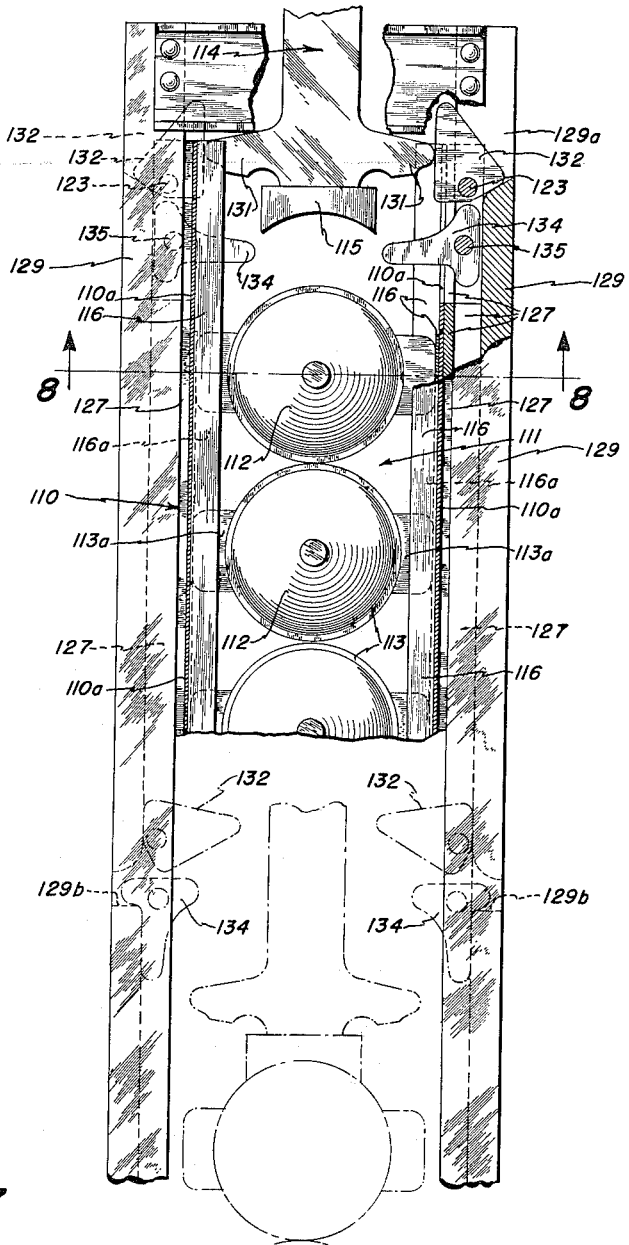
Fig. 7 is a detailed, enlarged and partially cutaway view of a portion of the launcher shown in Fig. 6.

Considering the carriage 110 and ram 114 in greater detail, as shown in Fig. 4 the carriage 110 is provided with two guide rails 127 on one side thereof, and is similarly provided on the other side, which cooperate with corresponding guide slots provided in beams 129 fixedly secured to the body of the aircraft, to guide the carriage 110 in its up and down sliding movement between extended and retracted positions. As best shown in Figs. 6 and 7, the carriage 110 provides a chute 111 in which a plurality of missiles 112 are vertically stacked. In the present embodiment, each missile 112 is preferably provided with its individual launching tube 113 encompassing the missile 112 and having two pairs of extending ears 113a, best shown in Figs. 7 and 8, fitting into guide slots 116a provided therefor in the beams 116 affixed to the side plates 110a of carriage 110, for guiding the stack of missiles in advancing movement through the carriage 110 from the missiles' loaded positions to the missile launching position 124.

The ram 114 is substantially U-shaped as shown in Fig. 4, and is provided at each of its ends with a missile engaging arbor 115 and a pair of dog tripping flanges 131. Each pair of tripping flanges cooperates with a pair of triangularly shaped dogs 132 pivotally secured to the guide rails 127 at 123 and a pair of angularly shaped dogs 134 pivotally secured to the guide rails 127 at 135. These dogs in turn cooperate with the beams 129 and the recesses 129a and 129b formed therein. When the carriage 110 is moved from extended to retracted position, which is accomplished, as is apparent from a consideration of Fig. 7, by engagement of the flanges 131 of the ram 114, when moving upwardly from the dot-dash line position shown in Fig. 7, with the triangularly shaped dogs 132. The pivotability of these dogs is restrained by the engagement of one side thereof with the beam 129, and therefore as they are engaged by the flanges of the ram they are raised upwardly along with the entire carriage structure to which they are attached. Upon the carriage reaching its retracted position (solid line representation of Fig. 6), the dogs 132 have been slid along the beam 129 until one corner of each of these dogs is in position to be cammed into the recesses 129a therefor, which is accomplished substantially at the limit of the upward stroke of the ram 114. Upon this position being reached, as illustrated in the solid line portion of Fig. 7, the entire weight of the carriage is supported by the beams 129 and the remainder of the aircraft structure through the triangularly shaped dogs 132, and the ram 114 is relieved of its burden, it merely now functioning to hold the triangularly shaped dogs cammed into said recesses. As is to be further noted from the solid line portion of Fig. 7, the straight edge portion of each of the angularly shaped dogs 134 lies flush with the beam 129 when the carriage is in retracted position, so that upon downward movement of the ram 114 from the solid line position of Fig. 7 toward the dot-dash line position thereof, which relieves the camming force of the flanges 131 on the triangularly shaped dogs 132, the force of the downwardly moving ram flanges act upon the angularly shaped dogs 134 to push the entire carriage therewith. During downward or upward movement of the carriage, the ram flanges are therefore sandwiched between the two pairs of dogs when they are between the pairs of recesses 129a and 129b, thus placing the movement of the carriage under positive control of the ram 114. As the ram descends and as the carriage descends therewith, the extended position of the carriage illustrated in dot-dash lines in Fig. 6 is reached at the time that the angularly shaped dogs 134 reach the recesses 129b in the beam 129 (shown in Fig. 7). As these last-mentioned dogs reach these recesses, a portion of each dog is cammed into its recess 129b by further downward action of the ram 114, thus stopping the downward movement of the carriage, but the rotation of the dogs in entering said recesses enables the ram to continue on past this position to engage the uppermost missile in the stack. As the lowermost missile 112 is placed in the missile launching position 124 of the carriage 110, which may be its initial loaded position or it may be advanced thereto by action of the ram, it may be fired from its launching tube 113. As indicated, after the hoist 117 has operated through the ram to extend the carriage, it is then utilized to advance the missiles 112 successively into launching position by continued downward movement of the ram. As each missile is fired from its launching tube, the next missile is advanced into launching position, and in so doing the launching tube from which the previous missile has been fired is ejected from the bottom of the chamber 111. If desired, an automatic control system may be incorporated to operate the hydraulic piston of the pulley system for advancing the ram 114 upon each missile firing and thus bring each of the missiles stacked in the chamber 111 successively into the firing position 124. A spring urged detent or the like (not shown) may be provided at the missile launching end of the carriage 110 to retain the stacked missiles and their launching tubes in the chute except when ejected by force of the ram 114. By the previously described action of the dogs 132 and 134, it is apparent that the ram 114 is relieved of the weight of the carriage and its contents at all times except when moving the carriage between extended and retracted positions; in the retracted position, the weight of the carriage is supported by the beams 129 through the dogs 132 cammed into the recesses 129a, while during extended position of the carriage it is supported by the beams 129 through the dogs 134 cammed into the recesses 129b.

Thus, in accordance with the present invention, when it is desired to fire a missile or rocket from the present missile launching system, the hydraulically actuated pulley 117 is operated causing the ram 114 to lower the carriage 110 into its extended position, whereupon continued lowering of the ram 114 causes the missiles to successively advance into the firing position of the carriage and be fired therefrom, the individual launching tubes encompassing each missile, being preferably expendible, are jettisoned after the firing of each missile by the advancement of the next missile into the firing position.

Although herein described in an embodiment employing only a single stack of missiles, it is apparent that the present embodiment may be so modified as to house a plurality of stacks of missiles for simultaneous firing and advancement of each stack, or a plurality of stacks of missiles contained within a single carriage may be each actuated by a separate ram controlled by a separate pulley or other actuating system for single firing, as would be apparent to one skilled in the art. In addition, the carriage and the action of the ram here described may be so modified as to provide a plurality of vertically adjacent missile launching positions in the carriage, so that a plurality or barrage of missiles may be fired simultaneously from a single stack rather than the single successive firings hereinabove indicated. Other modifications of the present embodiment will be apparent to those skilled in the art.

Figure 9:
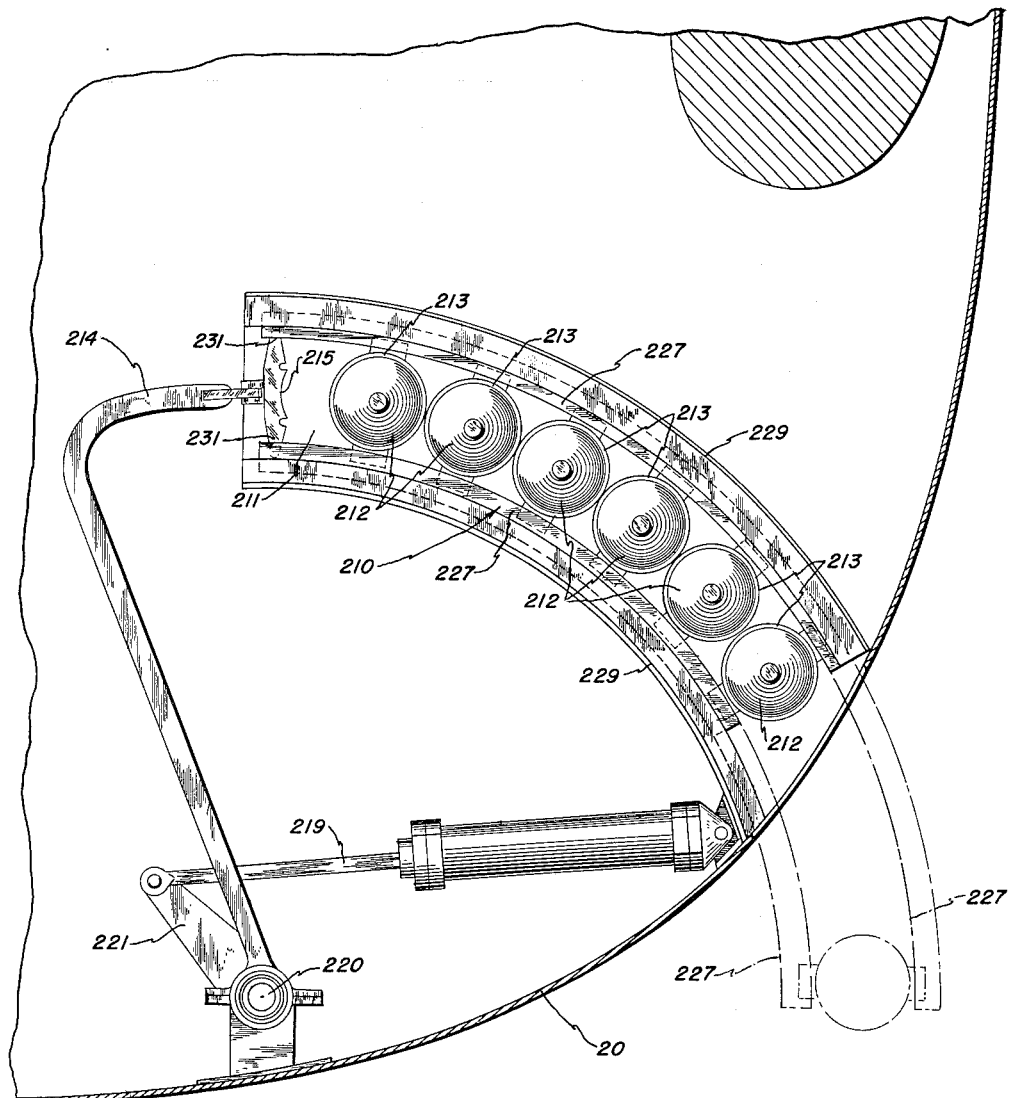
Fig. 9 is an end view of a missile launching system comprising a third embodiment of the present invention.

The embodiment of the present invention shown in Fig. 9 is a modification of that shown in Figs. 3–8 above described, the difference between these two embodiments being in the main the provision in the latter of an arcuate carriage which moves along an arcuate path between its extended and retracted positions. To this end, the carriage 210 which contains a stack of missiles 212, each housed within its own launching tube 213, is provided with the arcuate guide rails 227 along its sides which cooperate with guide slots formed in the beams 229, structurally supported by the airplane, for sliding reciprocation of the carriage between its extended position, indicated by the dot-dash lines, and its retracted position, shown in solid lines. Also the present embodiment is provided with a ram 214 having a missile engaging arbor 215 and a pair of dog engaging and tripping flanges 231 at the rocket engaging end of the ram. The carriage is further provided with dogs (not shown) similar to those indicated by the numerals 132 and 134 of the preceding embodiment and a similar structure of beams 229 as previously described for beams 129 for cooperation with these dogs to effect the movement of the carriage itself between extended and retracted positions and the advancement of the missiles stacked within the carriage chute 211 into the missile firing position of the carriage, in the same manner as described for the previous embodiment. Since the carriage of the present embodiment is arcuate and travels along an arcuate path between extended and retracted positions, the ram 214 must similarly travel in an arcuate path. The ram 214 is therefore pivoted on the shaft 220 and is operated by a hydraulic control means comprising the pistons 219 cooperating with the crank arm 221 to drive the ram 214 in both directions of its arcuate travel, as desired during the operation of the present launching system.

In accordance with the previous statement of the present invention, there is therefore provided by the several embodiments herein shown and described a launching system for rockets or other similar missiles, which is particularly adapted for use in aircraft since it provides for the extension or retraction of the launching portion of the system as desired, the system being put in its extended position when it is desired to launch missiles therefrom, as this extended position places the take-off path of launched missiles free and clear of the aircraft and its appendages, while it is kept in retracted position when it is not desired to launch missiles therefrom, so as not to obstruct or otherwise interfere with the air flow along the aircraft or maneuverings of the craft. In addition, the launching systems comprising the present invention are adaptable when in extended positioned to the firing and launching of single missiles sequentially or of a plurality of missiles simultaneously, if desired, as a barrage. The detailed descriptions of the several embodiments herein had are presented merely by way of example, and modifications of these embodiments within the spirit and scope of the appended claims will be apparent to those skilled in the art, and such modifications are within the contemplation of the present patent. Further, although herein specifically described in its adaptation to aircraft, it is apparent that the present invention is similarly adaptable to mounting on various types of land and sea craft and fixed installations.

What is claimed is:

1. A missile launcher for vehicles comprising a missile carriage housed by said vehcle, a plurality of stacked missile containing launching tubes contained by said carriage, said carriage being slidable between a retracted position substantially within said vehicle and an extended position protruding from said vehicle, guide rails affixed to said carriage, guide beams affixed to said vehicle and cooperating with said rails to guide said carriage in its movement between extended and retracted positions, a ram entering said carriage for moving the same between extended and retracted positions, two pairs of dogs pivotally secured to said carriage and cooperating with said ram and guide beams to enable extension and retraction of said carriage by movement of said ram, said beams having two pairs of recesses formed therein, one pair of recesses cooperating with a first pair of said dogs to support said carriage in extended position, the second pair of recesses cooperating with the second pair of dogs for supporting said carriage in retracted position, the movement of said ram in extending and retracting said carriage appropriately camming said dogs into and out of their respective recesses, and means for moving said ram to effect said carriage extension and missile advancement after the carriage has been moved to the extended position to thereby advance the stacked missiles successively into a missile launching portion of the carriage and for subsequently retracting said carriage to its retracted position.

2. A missile launcher for aircraft comprising a missile carriage housed by said craft and providing a chute for containing a plurality of stacked missiles each substantially encompassed by an individual launching tube, said carriage being slidable between a retracted position substantially within said craft and an extended position protruding from said craft, guide rails affixed to said carriage, guide beams affixed to said craft and cooperating with said rails to guide said carriage in its movement between extended and retracted positions, a ram entering said chute for moving said carriage between extended and retracted positions, two pairs of dogs pivotally secured to said carriage and cooperating with said ram and guide beams to enable extension and retraction of said carriage by movement of said ram, said beams having two pairs of recesses formed therein, one pair of recesses cooperating with a first pair of said dogs to support said carriage in extended position, the second pair of recesses cooperating with the second pair of dogs for supporting said carriage in retracted position, the movement of said ram in extending and retracting said carriage appropriately camming said dogs into and out of their respective recesses, and means for moving said ram to effect said carriage extension and missile advancement after the carriage has been moved to the extended position to thereby advance the stacked missiles successively into a missile launching portion of the carriage and to eject the previous fired missile launching tube and for subsequently retracting said carriage to its retracted position.

3. A missile launcher for vehicles comprising an arcuate missile carriage housed by said vehicle, a plurality of stacked missile containing launching tubes contained by said carriage, said carriage being slidable between a retracted position substantially within said vehicle and an extended position protruding from said vehicle, arcuate guide rails affixed to said carriage, arcuate guide beams affixed to said vehicle and cooperating with said rails to guide said carriage in its movement between extended and retracted positions, a ram having tripping flanges slidably received by said guide beams with said ram disposed partially within said carriage for moving the latter between extended and retracted positions, a plurality of spaced dogs pivotally secured to the guide rails and engageable with said tripping flanges and guide beams to enable extension and retraction of said carriage by movement of said ram, said beams having a plurality of recesses formed therein, a first pair of said dogs being received by certain ones of said recesses to support the carriage in extended position, a second pair of dogs being received by certain other ones of said recesses for supporting said carriage in retracted position, said dogs and said tripping flanges having cooperating cam surfaces for engagement with one another for camming the dogs into and out of their respective recesses, and means for moving said ram to effect said carriage extension and missile advancement through an arcuate path after the carriage has been moved to the extended position to thereby advance the stacked missiles successively into a missile launching portion of the carriage and to eject the previous fired missile launching tube and for subsequently retracting said carriage to its retracted position.

References Cited in the file of this patent

UNITED STATES PATENTS

| 2,193,139 | Monteith et al. | Mar. 12, 1940 |
| 2,250,240 | Steuerlein | July 22, 1941 |
| 2,273,724 | Nelson | Feb. 17, 1942 |
| 2,409,210 | Jolly | Oct. 15, 1946 |
| 2,440,723 | MacDonald | May 4, 1948 |
| 2,450,929 | Ashworth et al. | Oct. 12, 1948 |
| 2,451,745 | Jolly | Oct. 19, 1948 |
| 2,608,132 | Lauritsen | Aug. 26, 1952 |
| 2,630,740 | Robert et al. | Mar. 10, 1953 |
| 2,630,741 | Robert et al. | Mar. 10, 1953 |

FOREIGN PATENTS

| 428,934 | Great Britain | May 15, 1935 |
| 490,027 | Great Britain | July 27, 1938 |
| 411,576 | Italy | Jan. 18, 1945 |
| 431,590 | Italy | Mar. 2, 1948 |